United States Patent

Keesman et al.

[11] Patent Number: 5,805,224
[45] Date of Patent: Sep. 8, 1998

[54] METHOD AND DEVICE FOR TRANSCODING VIDEO SIGNALS

[75] Inventors: Gerrit J. Keesman; Petrus J. Van Otterloo, both of Eindhoven, Netherlands

[73] Assignee: U.S. Philips Corporation, New York, N.Y.

[21] Appl. No.: 601,406

[22] Filed: Feb. 14, 1996

[30] Foreign Application Priority Data

Feb. 15, 1995 [EP] European Pat. Off. ............. 95400325

[51] Int. Cl.⁶ ........................... H04N 7/12; H04N 11/02; H04N 11/04
[52] U.S. Cl. ........................... 348/405; 348/419; 348/423
[58] Field of Search ........................... 348/405, 419, 348/423; H04N 11/02, 11/04, 7/12

[56] References Cited

U.S. PATENT DOCUMENTS

| 5,410,351 | 4/1995 | Kojima | 348/405 |
| 5,515,105 | 5/1996 | Lim | 348/405 |
| 5,537,440 | 7/1996 | Eyuboglu et al. | 348/405 |
| 5,544,266 | 8/1996 | Koppelmans et al. | 348/423 |
| 5,565,924 | 10/1996 | Haskell et al. | 348/423 |
| 5,606,371 | 2/1997 | Gunnewiek et al. | 348/405 |

FOREIGN PATENT DOCUMENTS

| 0637893A1 | 2/1995 | European Pat. Off. . |
| 0655868A1 | 5/1995 | European Pat. Off. . |

Primary Examiner—Tommy P. Chin
Assistant Examiner—Nhon T. Diep
Attorney, Agent, or Firm—Laurie E. Gathman

[57] ABSTRACT

A method of transcoding coded video signals and a corresponding device for implementing this method are described. The device comprises decoding and encoding sub-assemblies (201, 202) and, within the encoding sub-assembly, quantizer (23) and bitrate controller. This bitrate controller comprise, before the quantizer (23), circuit for computing a local target value for encoding each sub-picture of the images to which video signals correspond and circuit for controlling the step size during the quantizing step.

6 Claims, 3 Drawing Sheets

METHOD AND DEVICE FOR TRANSCODING VIDEO SIGNALS

BACKGROUND OF THE INVENTION

The invention relates to a method of transcoding video signals corresponding to a sequence of images subdivided into a plurality of sub-pictures. The invention also relates to a device for implementing such a transcoding method.

A device for encoding a video signal, and more particularly groups of pictures, some pictures of which are subjected to independent encoding and other pictures are subjected to motion-compensated predictive encoding, is described in an european patent application first filed on, or based on a priority of, Nov. 22nd, 1994, with the number 94203396.0 and not yet published.

This encoding device, shown in FIG. 1, comprises a memory 1 in which each picture is split into blocks of, for example 8×8 pixels. A predetermined number of contiguous blocks, for example four blocks of 8×8 luminance samples and two blocks of 8×8 chrominance samples, constitute a sub-picture. In the case of the MPEG standard proposed by the International Standard Organization's Moving Picture Experts Group for the multiplexed, compressed representation of video and associated audio signals, the conventional syntax specifies that such a subpicture will also be referred to as macroblock.

The blocks of 8×8 samples are applied to an encoder 2 via a picture delay 10. This encoder comprises a subtracter circuit 21, a picture transformer 22 for transforming each block into 8×8 coefficients, a quantizer 23 for quantizing the coefficients with a stepsize $Q_1$ (it is to be noted that not every coefficient of a block is necessarily quantized with the same stepsize, and that the expression "step size" can be understood to mean a parameter fixing the distinct quantization steps for a block of coefficients) and a variable length encoder 24 for encoding the quantized coefficients into code words of variable length. The encoder further comprises a prediction loop for forming a motion-compensated prediction picture. This loop comprises an inverse quantizer 25, an inverse picture transformer 26, an adder circuit 27, a picture memory 28 and a motion estimator 29 (in FIG. 1, the circuits 22 to 26 are denoted T, Q, VLC, $Q^{-1}$ and $T^{-1}$ respectively).

The obtained series of code words of variable length constitutes a quantization-dependent bit stream $q_1$ of coefficient bits. This bit stream is combined in a multiplexer 3 with other information which is formed, inter alia with motion vectors produced by motion estimator 29. The other information will hereinafter be referred to as "overhead" and is denoted by $v_1$ in the Figure. The combined bit stream is applied to a buffer 4 from which it is read at a channel bitrate $f_{ch}$.

In such a known MPEG encoder, the video signal is transmitted in the form of groups of pictures (GOPs). Each GOP comprises at least one intraframe-encoded picture (I picture), a number of predictively encoded pictures (P pictures) and a number of bidirectionally predictively encoded pictures (B pictures). When encoding I pictures, the subtracter 21 is not active and each block of pixels is encoded individually. For P and B pictures, the motion estimator 29 supplies a prediction block and a difference block is encoded. If there is insufficient conformity between a block of the supplied picture and its ambience in prediction picture memory 28 (i.e when there is too much motion), blocks of P and B pictures may also be subjected to intraframe encoding. Information with respect to the applied encoding mode of a block is also accommodated in the overhead information $v_1$.

As shown in FIG. 1, the encoding device further comprises an additional encoder 8, a computing circuit 9 coupled thereto for computing a global target value for the number of bits for encoding the picture, a control circuit 7 and a stepsize determining circuit 11. The additional encoder 8 will hereinafter also be referred to as preanalyser. It forms a quantization-dependent bit stream $q_2$ and overhead information $v_2$. This preanalyser receives from the stepsize determining circuit 11 a quantization stepsize $Q_2$ which is invariable during a picture but may be different from picture to picture. It may have different forms, and for example the form of an MPEG encoder without bitrate control. The preanalyser is then of the same type as encoder 2 and therefore it is not shown in greater detail.

It is known, however, that a transcoding structure benefits from a certain reduction of complexity with respect to the association of classical decoder and encoder. The decoder uses, for example, motion vectors which may be re-used in the encoder, which provides the possibility of omitting the motion estimation circuit usually arranged in the encoder. Similarly, in the case of MPEG type signals, the images may be coded in different modes: the encoder may, for example, re-use the decision as such, taken in the preceding decoder, relating to the choice of image encoding or field encoding. It is also known that, within a group of pictures, the order according to which the pictures are sent to the encoder is modified in order to allow pictures of B type to be predicted. These pictures of B type are delayed by two picture periods and this modified order is used for the transmission, the original order being restituted only at the decoder output. In the case of a transcoding structure with an encoder following a decoder, it is simpler not to provide for such a restitution at the decoder output, since a further modification of the picture order has to be provided for within the encoder.

However, whatever these simplifications, their advantages are cancelled if the complexity of the encoding subassembly is increased by addition of a second encoder, and the cost of the transcoder thus constituted is therefore not reduced.

SUMMARY OF THE INVENTION

It is therefore a first object of the invention to propose a transcoding method allowing to reduce actually the complexity of the conventional ones.

To this end, the invention relates to a transcoding method comprising the operations of:

decoding said coded signals which are associated with each image of the sequence;

quantizing with an applied stepsize the decoded signals thus obtained;

encoding the quantized signals;

modifying said stepsize according to the output bitrate of the coded signals thus obtained;

in which said modifying operation comprises the sub-steps of:

computing a local target value $T_n$ for the number of bits for encoding each of the N subpictures of each image;

modifying the stepsize in view of said output bitrate and said computed local target value.

Such a transcoding method appears as simpler and less expensive than conventional ones, and particularly than a method as used in the transcoding structure described in the cited patent application.

According to a first implementation of this method, said computing sub-step comprises the sub-operations of:

counting the local number of bits generated for each of said subpictures and the total number of bits for an entire picture;

multiplying said total number of bits by a quantization stepsize;

in view of the output signal thus obtained and of a previously selected complexity value, computing a global target value for the number of bits for encoding the relevant entire picture;

distributing said global target value among the subpictures in proportion to said local number of bits generated for each subpicture.

According to a second implementation of said method, said computing sub-step comprises the sub-operations of:

counting the local number of bits generated for each of said subpictures and the total number of bits for an entire picture;

defining said local target value $T_n$ by determining it according to the formula $T_n = S \times R_{out}/R_{in}$ where S is the total number of bits spent to compress each incoming picture and $R_{in}$, $R_{out}$ are the total number of bits respectively before decoding operation and after encoding operation.

Whatever this implementation, the stepsize modifying operation can advantageously comprise the sub-operations of:

determining for each subpicture the difference between said local target value and a desired average target value $T_{av}$;

accumulating the obtained differences in the form of a desired packing density b' of an output buffer;

generating a control signal related to the difference between said packing density and the actual one b;

multiplying said control signal by two respective control factors;

integrating one of the signals obtained after said multiplying sub-operation;

adding said integrated signal and the other one of the signals obtained after said multiplying sub-operation.

It is another object of the invention to propose a transcoding device in which an unusual implementation of its encoding part particularly suitable for processing datas in conformity with the MPEG standard, leads to a limited complexity of its circuitry.

To this end, the invention relates to a device for transcoding coded video signals corresponding to a sequence of images subdivided into a plurality of subpictures, which device comprises in cascade:

a decoding part for decoding said coded signals which are associated with each image of the sequence;

an encoding part for encoding output decoded signals of said decoding sub-assembly, comprising quantizing means for quantizing the decoded signals with an applied step size, encoding means for encoding the quantized signals, and control means of the output bitrate of the coded signals thus obtained by modification of said stepsize; in which said bitrate control means of the encoding part comprise, before said quantizing means, means for computing a local target value for the number of bits for encoding each subpicture and means for controlling said stepsize according to said output bitrate and said computed local target value.

Such a transcoding structure is indeed simpler and less expensive than conventional implementations, particularly than those in which the encoder provided in cascade with the decoder has a structure according to the cited patent application.

In particular implementation of said transcoding device according to the invention, this devices comprises in cascade:

a decoding sub-assembly for decoding said coded signals;

an encoding sub-assembly for encoding said decoded signals, comprising a quantizer for quantizing the decoded signals with an applied stepsize and bitrate control means by modification of said stepsize; in which said bitrate control means comprise a computing circuit for defining a local target value for the number of bits for encoding each of the N subpictures of each image and a control circuit for adjusting said stepsize in conformity with said output bitrate and said computed local target value.

According to a first embodiment, said computing means preferably comprise:

counters for counting the local number of bits $B_n$ generated for each of said subpictures and the total number of bits $S = \Sigma B_n$ for an entire picture;

a multiplier of this total number by a quantization stepsize $Q_2$;

a computing circuit for receiving the output signal of this multiplier and a previously selected complexity value and computing a global target value T for the number of bits for encoding the relevant entire picture;

a distribution circuit for distributing said global target value T among the subpictures.

In another embodiment, said computing means may also comprise:

counters for counting the local number of bits $B_n$ generated for each of said subpictures and the total number of bits $S = \Sigma B_n$ for an entire picture;

a circuit for defining said local target value among the subpictures according to the formula $T_n = S \times R_{out}/R_{in}$, in which $R_{in}$ and $R_{out}$ are the total number of bits at the input and the output of said transcoding device, and S is said total number of bits spent to compress each incoming picture.

According to the invention, said transcoding device is also preferably characterized in that said stepsize control means comprise:

a first subtracter which determines for each sub-picture the difference between the local target value $T_n$ and a desired average target value $T_{av}$;

a third counter for accumulating obtained differences in the form of a desired packing density b' of an output buffer of the encoding sub-assembly;

a second subtracter in which said packing density is compared with the actual packing density b of said buffer for supplying a control signal;

second and third multipliers of said output control signal of said second subtracter by respective control factors;

an integrator of the output of said third multiplier;

an adder of the outputs of the second multiplier and the integrator.

In an improved implementation, said bitrate control means may also comprise, before said quantizer, a memory for converting the coded signal corresponding to the stepsize of each subpicture into said stepsize value and a fourth multiplier of the output signal of said memory by the output signal of said stepsize control means.

BRIEF DESCRIPTION OF THE DRAWING

These and other aspects of the invention will be apparent from and elucidated with reference to the embodiments described hereinafter.

In the drawings

DETAILED DESCRIPTION OF THE PREFERRED EMBODIMENTS

Figure 1:
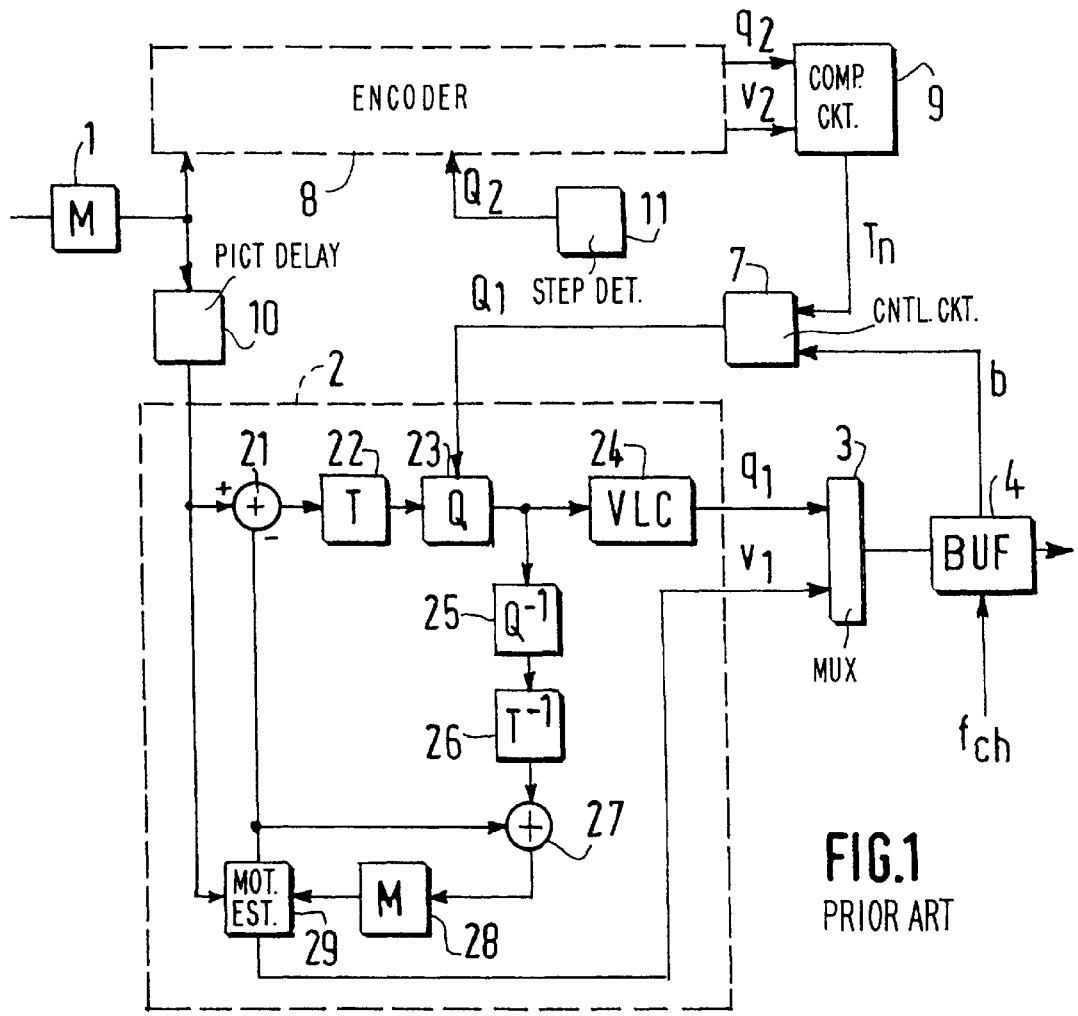
FIG. 1 shows a device for encoding a video signal according to the previously cited european patent application.

Before describing such embodiments of transcoding devices according to the invention, the principle of this invention will be clearly shown. The present method is provided for transcoding signals corresponding to a sequence of images subdivided into a plurality (for instance N) of subpictures (e.g. macroblocks) and between which motion can be observed. These video signals have been previously coded by an image encoder including a quantizing mechanism that controls the trade-off between the bitrate and the picture quality of the reconstructed pictures (the relation between these variables depends of course on the original picture content, which is expressed in a picture complexity, a more complex picture requiring a given number of bits greater than a less complex picture to achieve a predetermined quality), such as an MPEG encoder.

This transcoding method comprises the following operations. The coded signals which are associated with each image of the input video sequence are first decoded, and the decoded signals thus obtained are then quantized with an applied step size and coded. Said step size can be modified according to the output bitrate of the coded signals thus obtained, in order to control said bitrate. According to the invention, this modifying operation comprises the sub-steps of computing a local target value for the number of bits for encoding each of the subpictures of each image (this target value, called $T_n$, is defined as described hereinafter according to different possible criteria) and of modifying the applied step size in view of both output bitrate and computed local target value.

According to a particular way of carrying out this method, said computing sub-step is subdivided into the following sub-operations. First the local numbers of bits $B_n$ originally generated for each of the subpictures of an image are successively counted, which also allows to count and know the total number of bits $S=\Sigma B_n$ for each successive entire picture. Said total number of bits S is then multiplied by a quantization step size $Q_2$ obtained for each type I, P, B of picture, in order to give as a result a product representative of the complexity of the concerned picture and used for computing (according to different possible formulas given hereinafter) a global target value T for the number of bits for encoding this concerned picture. Finally this global target value is distributed among the subpictures by computing for each of the N subpictures the local target value $T_n$, according to several possible formulas given later.

According to another particular way of carrying the transcoding method, the computing sub-step can be slightly modified: after a similar counting sub-operation of $B_n$ and S, the local target value $T_n$ is now defined by computing it according to a simpler formula, once more given later in relation with the description of an embodiment of the corresponding device.

In all these cases, the stepsize modifying operation can be more particularly carried out by implementing the following sub-operations. First the difference between the local target value previously obtained and a desired average value $T_{av}$, the fixed value of which is depending on the number of bits R per GOP, the number of pictures in a GOP and the number of subpictures per picture, is computed for each subpicture, and the differences thus obtained are accumulated in the form of a desired packing density (called b' and available under the form of a number of bits) of an output buffer. This density b' is then compared to the actual one b, the difference between these signals constituting a control signal which is multiplied by two respective factors. The first one of the signals obtained after such a multiplying sub-operation is integrated, and the result is added to the second one of these two signals, the signal finally obtained being a control signal of the step size $Q_1$.

The transcoding method which has been described above can be implemented in several manners, for instance with the aid of wired electronic modules or in the form of embodiments including a processor or microprocessor which ensures the performance of series of instructions corresponding to the functions, computations or all kinds of operations carried out in certain or all circuits, stages or assemblies of said electronic embodiments.

In the latter case of an embodiment with a processor or microprocessor, the transcoding method, which has been described without any consideration of structure of a transcoding device, can be implemented in such a device including in cascade a first decoding part for decoding the input signals previously coded and associated with each image of the sequence, followed by a second decoding part for encoding the decoded signals thus obtained. This encoding part mainly comprises quantizing means for quantizing said decoded signals obtained at the output of the decoding part, encoding means receiving said quantized signals and generating coded signals, and control means provided for modifying the stepsize applied to the quantizing means in view of a control of the output bitrate of these coded signals. For that modification, said bitrate control means comprise, before said quantizing means, first means for computing the lcoal target value and second means for controlling the step size of the quantizing means according to the output bitrate and the computed local target value.

Figure 2:
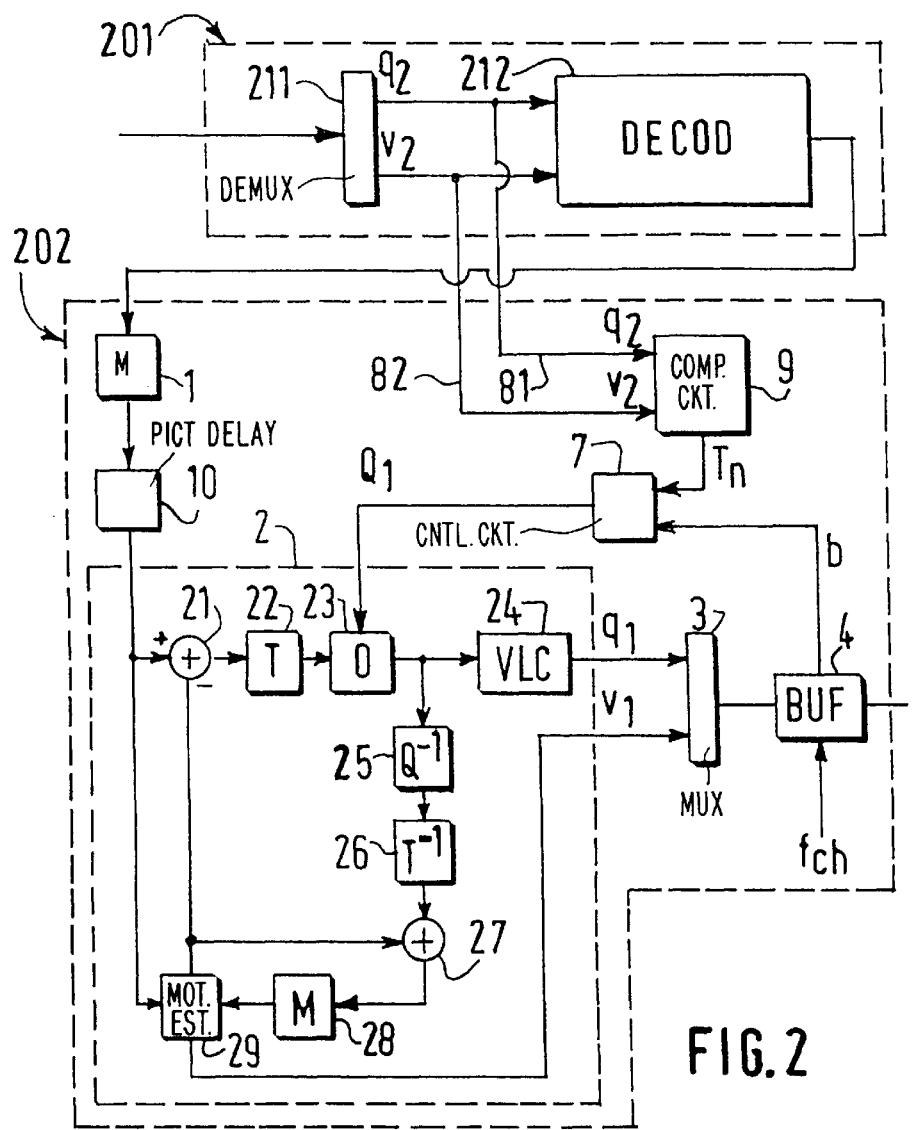
FIG. 2 shows an embodiment of a transcoding device according to the invention.

In the former case, the transcoding method can for instance be implemented in the form of a transcoding device as shown in FIG. 2, in which decoding and encoding part consist respectively in a decoding sub-assembly 201 and an encoding sub-assembly 202. As shown in this embodiment of FIG. 2, the decoding sub-assembly 201 comprises in cascade a demultiplexing circuit 211, which generates a coefficient bit stream $q_2$, an overhead bit stream $v_2$, and possibly other signals not useful here, and a decoding device 212 (DECOD) which can be conventional and will therefore not be further described (such an decoder comprises for example, in series, a variable length decoder, an inverse quantizing circuit and a motion compensation stage).

The encoding sub-assembly 202 comprises the same elements as the encoding device shown in FIG. 1 (with the same references), except for the additional encoder 8 and the circuit 11. This encoder 8 and the circuit 11 are no longer provided in the encoding sub-assembly of FIG. 2 and are replaced by connections 81 and 82 between the outputs $q_2$, $v_2$ of the demultiplexing circuit 211 and the corresponding inputs of the computing circuit 9.

The encoding device shown in FIG. 1 was using a pre-analysis predicting how many bits are required for each sub-picture of the current picture to be coded. A transcoding device includes a variable length decoder with which the incoming bit stream is decoded. In the same time as this bit stream is decoded, data $q_2$ and $v_2$ can be considered as these numbers of bits per subpicture obtained during the above-described preanalysis. Therefore the additional encoder 8 is no longer provided, as already said, and the delay of the picture delay 10 can be reduced.

Figure 3:
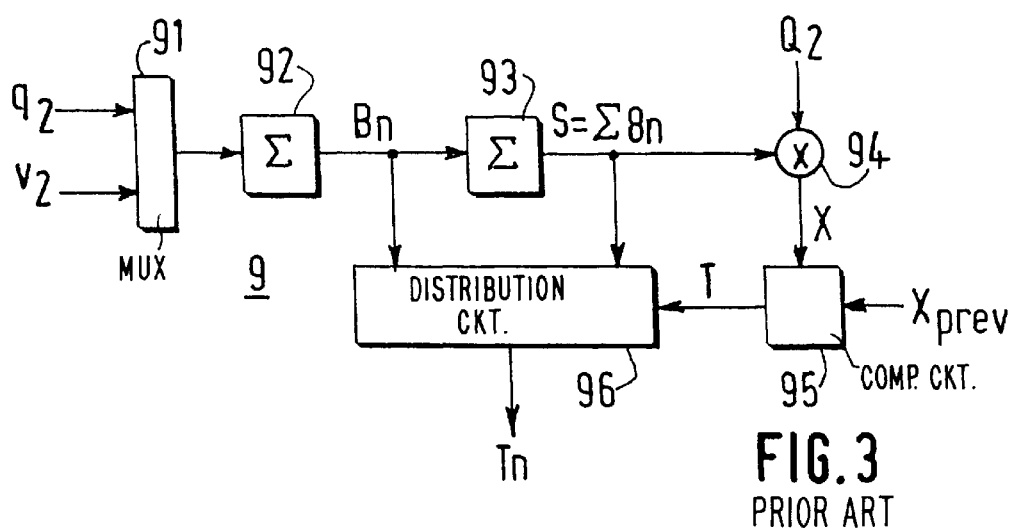
FIG. 3 shows an embodiment of a computing circuit as shown in the transcoding device of FIG. 2.

FIG. 3 shows diagrammatically an embodiment of the computing circuit 9. It comprises a multiplexer 91 for combining the coefficient bit stream $q_2$ and the overhead bit stream $v_2$ which are produced by the demultiplexing circuit 211 of FIG 2. The combined bit stream is applied to a counter 92 which counts the local number of bits $B_n$ while a further counter 93 counts the total number of bits $S=\Sigma B_n$. This number S is multiplied by a quantization stepsize $Q_2$ (either fixed per picture or different from picture to picture) in a multiplier 94. As previously, the fixed stepsize $Q_2$, separately defined for each type of picture, is obtained by determining the average stepsize of the considered pictures (I, P, B) and selecting the relevant one according to scene changes and picture type. The product $S.Q_2$ is a complexity value X, that is representative of the complexity of the applied picture. In fact, complexity values $X_I$, $X_P$, $X_B$ are separately determined for each type of picture (I, P, B):

$$X_I = S_I \times Q_{2I}, \quad X_P = S_P \times Q_{2P} \text{ and } X_B = S_B \times Q_{2B} \tag{1}$$

The complexity value is applied to a computing circuit 95 for computing the global target value T for the whole picture. The following considerations apply with respect to the computations performed by this computing circuit:

(A) The total number of bits R being available for a GOP comprising $N_I$ pictures of the type I, $N_P$ pictures of the type P and $N_B$ pictures of the type B, the aim is to ditribute the global target values $T_I$, $T_P$, $T_B$ for each type of picture in sucha a way that:

$$R = N_I \cdot T_I + N_P \cdot T_P + N_B \cdot T_B \tag{2}$$

is satisfied.

(B) It is assumed that the different encoding types (I, P, B) lead to an equal picture quality if the corresponding stepsizes $Q_I$, $Q_P$ and $Q_B$ are in a given ratio indicated by factors $k_P$ and $k_B$:

$$Q_P = k_P \cdot Q_I \text{ and } Q_B = k_B \cdot Q_I \tag{3}$$

The relation between the number of bits $S_P$, $S_B$ obtained in P and B encoding of a picture and the number of bits $S_I$ obtained in I encoding of this picture can be derived from (1) and (3):

$$S_P = \frac{X_P}{k_P \cdot X_I} S_I \text{ and } S_B = \frac{X_B}{k_B \cdot X_I} S_I \tag{4}$$

(C) The same relation is assumed to be applicable to the global target values for the different types of pictures:

$$T_P = \frac{X_P}{k_P \cdot X_I} T_I \text{ and } T_B = \frac{X_B}{k_B \cdot X_I} T_I \tag{5}$$

The following formula for the global target value $T_I$ for an I picture can be derived from (2) and (5):

$$T_I = \frac{R}{N_I + \frac{N_P \cdot X_P}{k_P \cdot X_I} + \frac{N_B \cdot X_B}{k_B \cdot X_I}} \tag{6}$$

(D) after the global target value $T_I$ for the last (or only) I picture of the GOP is fixed and the picture is encoded as much as possible in conformity therewith, the target values for the other P and B pictures may be adapted, if desired, to the remaining number of bits available for the GOP. In that case, equation (2) changes to:

$$R_I = n_P \cdot T_P + n_B \cdot T_B \tag{7}$$

in which $n_P$ and $n_B$ represent the number of P and B pictures still to be encoded in the GOP and $R_I$ represents the number of bits which is still available. The following formulas can now be derived for the target values $T_P$ and $T_B$:

$$T_P = \frac{R_I}{n_P + \frac{n_B \cdot k_P \cdot X_B}{k_B \cdot X_P}} \text{ and } T_B = \frac{k_P \cdot X_B \cdot T_P}{k_B \cdot X_P} \tag{8}$$

The global target value of a picture is computed by the computing circuit 95 before the relevant picture is applied via the picture delay 10 to encoder 2 (see FIG. 1) for actual encoding. The computation is effected as follows:

(I) During encoding of an I picture, the computing circuit 95 receives the complexity value $X_I$ of this picture from multiplier 94. The target value $T_I$ is computed by means of equation (6). The complexity values $X_P$ and $X_B$ in this equation are formed by previously computed complexity values of the most recent previous P or B picture. These previously computed complexity values are denoted by $X_{prev}$ in FIG. 3. They are stored in a memory (not shown) upon encoding of the previous picture.

(P) During encoding of a P picture, the computing circuit 95 receives the complexity value $X_P$ of this picture from multiplier 94. The target value $T_P$ is computed by means of equation (5) or, if the GOP no longer comprises any further I pictures, by means of equation (8). The complexity values other than $X_P$ are again formed by the previously computed complexity values of the most recent previous picture of the relevant type.

(B) During encoding of a B picture, the computing circuit 95 receives the complexity value $X_B$ of this picture from multiplier 94. The target value $T_B$ is computed by means of equation (5) or (8).

A distribution circuit 96 finally distributes the global target value T among the macroblocks of the picture. To this end, the distribution circuit computes the local target value $T_n$ for each macroblock n. In a simple embodiment, the distribution circuit can distribute the global target value T evenly among all N macroblocks of the pictures, according to the formula:

$$T_n = \frac{T}{N} \tag{9}$$

However, the local target value $T_n$ for each macroblock is preferably proportional to the number of bits $B_n$ produced for these macroblocks, according to the formula $$T_n = \frac{B_n}{\Sigma B_n} \times T \tag{10}$$

The local target value for a macroblock is in conformity with the relative complexity of this macroblock: more bits are now spent on a sub-picture as this sub-picture is more detailed. This yields a uniform picture quality throughout the picture.

Other embodiments of the computing circuit 9 can be proposed. It is for example possible that the number of coefficient bits and the number of overhead bits are separately counted for each macroblock n, by using separate counters for counting, macroblock by macroblock, the number of coefficient bits in the quantization-dependent bit stream $q_2$ and the number of bits in the overhead data $v_2$. The local target value $T_n$ is then subsequently obtained by multiplying, for each macroblock n, this number of coefficient bits $C_n$ by a scale factor F and adding the number of overhead bits $O_n$ thereto according to the formula:

$$T_n = F \times C_n + O_n \qquad (11)$$

The target value in accordance with equation (11) is more suitable than that in accordance with equation (10) because it is then avoided that too many bits of a macroblock are spent on overhead data. The distribution of the global target value among the macroblocks thus yields a more uniform picture quality than the embodiment shown in FIG. 3.

Figure 4:
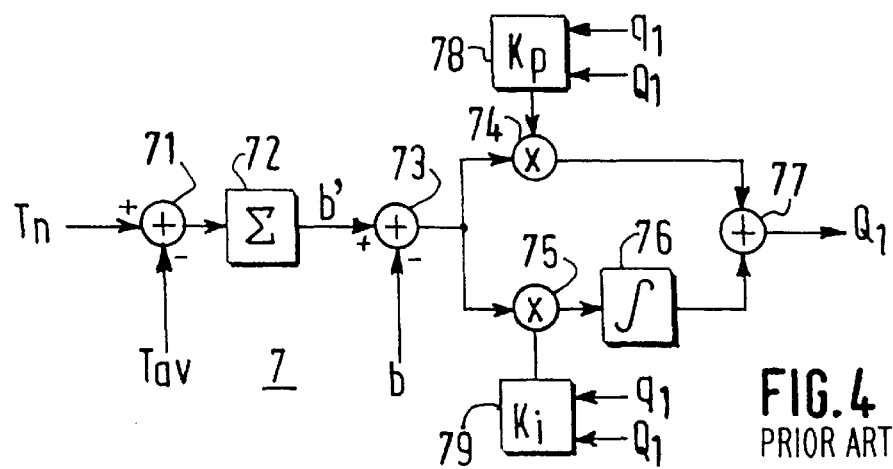
FIG. 4 shows an embodiment of the control circuit as shown in the transcoding device of FIG. 2.

The target values $T_n$ are applied to the control circuit 7 (see FIG. 1). FIG. 4 shows a possible embodiment of this control circuit. It comprises a subtracter 71 which determines, for each macroblock, the difference between the local target value $T_n$ and the desired average target value $T_{av}$. The obtained difference is accumulated by means of a counter 72. The output signal of the counter 72 forms as it were the desired packing density b' of the ouput buffer 4 (see FIG. 1) of the device. The control circuit further comprises a subtracter 73 in which the desired packing density b' is compared with the actual packing density b of the buffer. The difference (b'–b) between the two numbers of bits constitutes the control signal which is multiplied in a first multiplier 74 by a control factor $K_P$ and in a second multiplier 75 by a control factor $K_I$. The output of the second multiplier 75 is applied to an integrator 76. An adder 77 adds the outputs of multiplier 74 and integrator 76.

The elements 74–77 of the control circuit shown in FIG. 4 constitute a proportionally integrating (PI) controller which controls the stepsize $Q_I$ for supply to encoder 2 (see FIG. 1) without producing a residue in the control signal. The control factors $K_P$ and $K_I$ may be constants. An MPEG encoder may, however, be considered as a process having a non-constant gain. Constant factors $K_P$ and $K_I$ are then to be dimensioned in such a way that there is no instability of the control process, even for the most complicated signals. However the control process is stable under all circumtances when variations in gain are compensated by inverse variations in the control factors, in other words, when the product of control factor and gain is constant.

The present invention is not limited to these embodiments, from which modifications or improvements can be deduced without departing from the scope of the invention. For example, it must be understood that this invention can be used in any kind of transcoder, whatever its structure or the possible simplifications introduced into such a structure by considering for example the fact that some information used in the decoding part may be re-used in the subsequent encoding part.

Figure 5:
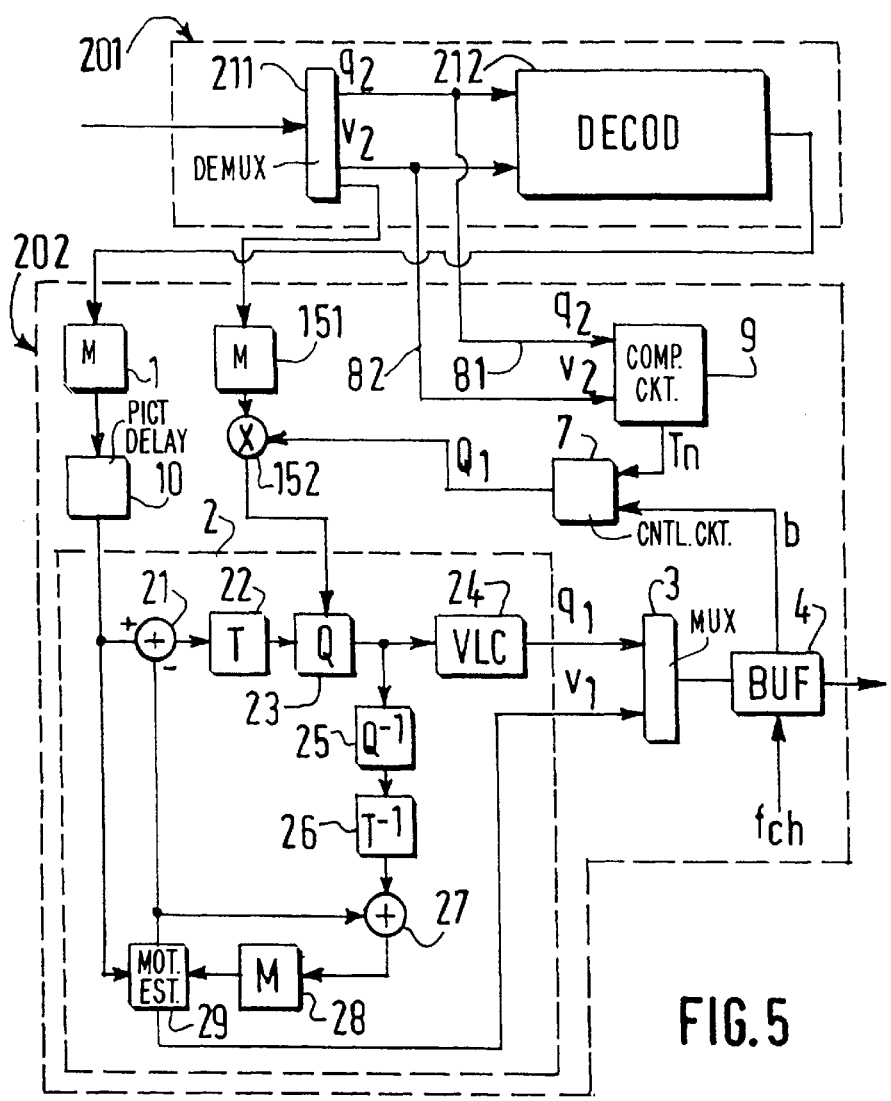
FIG. 5 shows another embodiment of a transcoding device according to the invention.

It should be also noted that the bitrate control means may have a more general form. It is known for example that in most MPEG encoders the stepsize is computed according to a formula of the type Q'=f(A).Q, where the function f(A) refers to the activity of the coded sub-pictures, usually computed from the original picture. In the situations where input pictures are not available (for instance with transcoders including such simplifications as indicated above), such an adaptive quantization is however possible, since the value of the activity of the sub-pictures can be deduced from the incoming bitstream (except for a scaling factor). FIG. 5 shows another embodiment of the transcoding device according to the invention, including such a modification. At the output of the demultiplexing circuit 211, the coded signal corresponding to the stepsize of each sub-picture is received by a memory 151 containing a conversion table from the coded words to the corresponding stepsizes (as provided for example in the MPEG-2 standard). The output signal of the memory 151, proportional to the activity of the coded sub-pictures, is multiplied in a multiplier 152 by the stepsize $Q_1$ for supply to the quantizer 23 of the encoder 2. The other elements of FIG. 5 have identical reference numerals as in FIG. 2, and identical functions.

Figure 6:
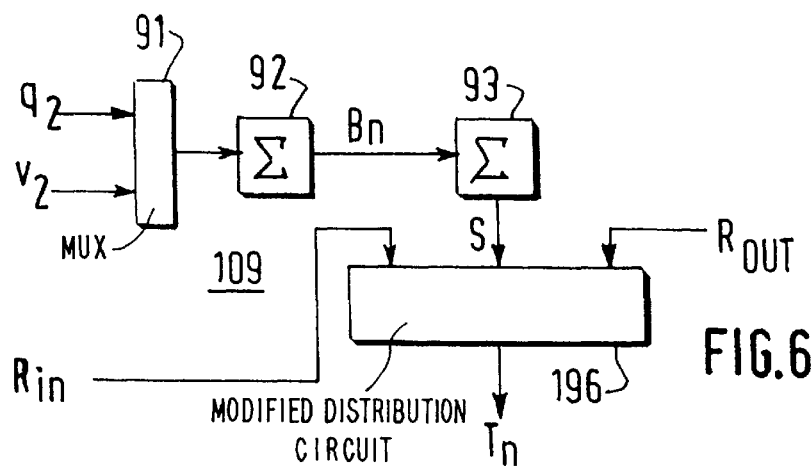
FIG. 6 shows another embodiment of a computing circuit as shown in the transcoding device of FIG. 2.

FIG. 6 shows another embodiment of the computing circuit shown in FIG. 2, in which it is now considered that the only difference between input and output of the transcoder is the bitrate. The local target value $T_n$ can then be computed as follows:

$$T_n = \frac{R_{out}}{R_{in}} \times S \qquad (12)$$

In this formula (12), $R_{in}$ is the total number of bits for the incoming picture, $R_{out}$ the corresponding total number of bits at the output of the buffer 4, and S the number of bits spent to compress the incoming picture, given from the incoming bitstream. The modified computing circuit 109 of FIG. 6 comprises therefore the same circuits 91 to 93 as in FIG. 3, and a modified distribution circuit 196 which receives the output signal S of the counter 93, the input number of bits $R_{in}$ (input signal of the decoding sub-assembly 201), and the output number of bits $R_{out}$ (output signal of the encoding sub-assembly 202), and generates the local target value $T_n$.

We claim:

1. A method of transcoding coded video signals corresponding to a sequence of images subdivided into a plurality N of subpictures, comprising the steps of:

decoding said coded signals which are associated with each image of the sequence;

quantizing with an applied stepsize the decoded signals thus obtained;

encoding the quantized signals;

modifying said stepsize according to the output bitrate of the coded signals thus obtained;

wherein the modifying step comprises the sub-steps of:
   computing a local target value $T_n$ for the number of bits for encoding each of the N subpictures of each image;

modifying the stepsize in view of said output bitrate and said computed local target value; and, wherein the computing sub-step comprises the further sub-steps of:
   counting the local number of bits generated for each of said subpictures and the total number of bits for an entire picture; and, determining said local target value Tn in accordance with the formula $T_n = S \times R_{out}/R_{in}$, where S is the total number of bits spent to compress each incoming picture and $R_{in}$ and $R_{out}$ are the total number of bits before a decoding operation and after an encoding operation, respectively.

2. A transcoding method as claimed in claim 1, in which said computing sub-step comprises the further sub-steps:

counting the local number of bits generated for each of said subpictures and the total number of bits for an entire picture;

multiplying said total number of bits by a quantization stepsize;

in view of the output signal thus obtained and of a previously selected complexity value, computing a global target value for the number of bits for encoding the relevant entire picture;

distributing said global target value among the subpictures in proportion to said local number of bits generated for each subpicture.

3. A transcoding method as claimed in claim 2, in which said stepsize modifying step comprises the sub-operations of:

determining for each subpicture the difference between said local target value and a desired average target value $T_{av}$;

accumulating the obtained differences in the form of a desired packing density b' of an output buffer;

generating a control signal related to the difference between said packing density and the actual one b;

multiplying said control signal by two respective control factors;

integrating packing density of the signals obtained after said multiplying sub-step;

adding said integrated signal and the other one of the signals obtained after said multiplying sub-step.

4. A transcoding device for transcoding coded video signals corresponding to a sequence of images subdivided into a plurality of subpictures, which device comprises, in cascade:

a decoding sub-assembly for decoding said coded signals;

an encoding sub-assembly for encoding said decoded signals, comprising:

a quantizer for quantizing the decoded signals with an applied stepsize to produce coded signals; and, bitrate control means for controlling the output bitrate of said coded signals by modification of said stepsize;

wherein said bitrate control means comprise a computing circuit for defining a local target value for the number of bits for encoding each of the subpictures of each image and a control circuit for adjusting said stepsize in conformity with said output bitrate and said computed local target value;

wherein said computing circuit comprises:

counters for counting the local number of bits $B_n$ generated for each of said subpictures and the total number of bits $S=\Sigma B_n$ for an entire picture; and, a circuit for defining said local target value among the subpictures according to the formula $T_n=S\times R_{out/Rin}$, where S is the total number of bits spent to compress each incoming picture, and $R_{in}$ and $R_{out}$ are the total number of bits at the input and the output of the transcoding device, respectively.

5. A transcoding device as claimed in claim 4, wherein said stepsize control circuit comprises:

a first subtracter which determines, for each subpicture, the difference between the local target value $T_n$ and a desired average target value $T_{av}$;

a counter for accumulating obtained differences in the form of a desired packing density b' of an output buffer of the encoding sub-assembly;

a second subtracter which determines the difference between said desired packing density b' and the actual packing density b of said output buffer, and which generates a control signal indicative of the determined difference;

first and second multipliers which multiply said output control signal of said second subtracter by respective control factors;

an integrator which integrates the output of said second multiplier; and, an adder which adds the outputs of the first multiplier and the integrator.

6. A device as claimed in claim 5, wherein said bitrate control means further comprise, before said quantizer, a memory for converting the coded signal corresponding to the stepsize of each subpicture into said stepsize value and a third multiplier which multiplies the output signal of said memory by the output signal of said stepsize control circuit.

* * * * *